May 31, 1932. K. G. YOUNG ET AL 1,861,202
LOCK NUT
Filed March 30, 1931
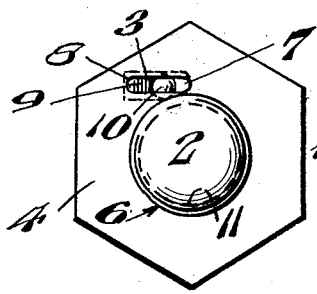
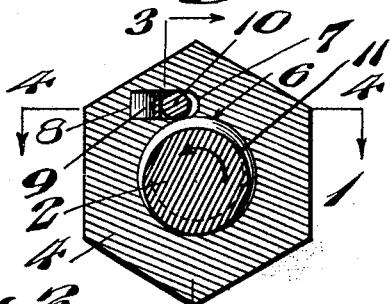
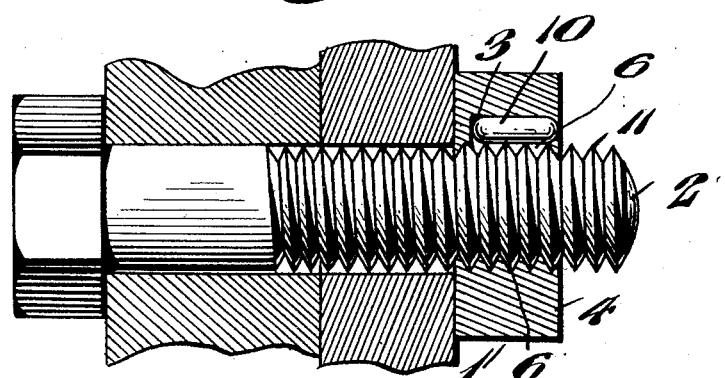
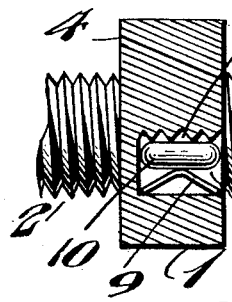
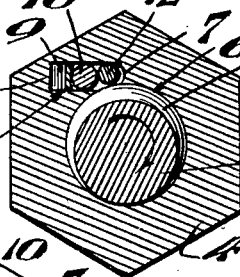
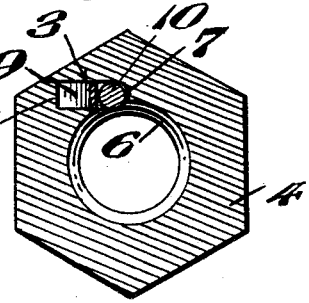
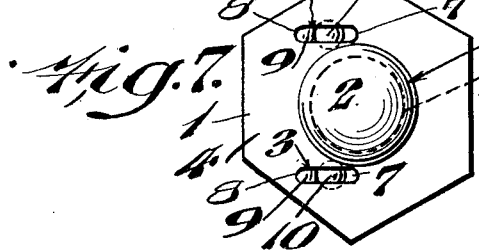
INVENTORS
KARL GOTTLOB YOUNG
HERMANN VEIT
BY Louis Necho
ATTORNEY.

Patented May 31, 1932

1,861,202

UNITED STATES PATENT OFFICE

KARL GOTTLOB YOUNG AND HERMANN VEIT, OF PHILADELPHIA, PENNSYLVANIA

LOCK NUT

Application filed March 30, 1931. Serial No. 526,476.

Our invention relates to a new and useful lock nut which is self locking so that once applied to a screw or threaded bolt it is prevented from back turning or working loose.

Our invention further relates to a lock nut which is self locking so that it will maintain itself in a fixed position against turning in either direction.

Our invention still further relates to a lock nut of this character which is of a simple and inexpensive construction and of means combined with said nut for releasing said nut to permit its rotation in either or both directions.

Our invention further relates to a novel method of making our novel lock nut which will hereinafter be described.

To the above ends our invention consists of a nut having an opening in the body thereof adjacent to and slightly communicating with the threaded central tap hole of the nut, a pin loosely positioned within said opening, a spring adapted to bear on said pin and means for preventing removal of said pin and said spring from said opening.

Our invention further consists in forming an opening in the body of said nut adjacent to and communicating with the threaded tap hole in the center thereof, positioning a pin and a spring in said opening, and finally boxing the edges of said opening to close the same to prevent the removal of said spring and pin.

Our invention further consists of other novel features of construction and advantage all as hereinafter described and claimed in connection with the accompanying drawings in which:

Fig. 1 is a plan view of a nut embodying our invention shown applied to the end of a bolt or screw.

Fig. 2 is a transverse section showing details of construction.

Fig. 3 is a section on line 3—3 of Fig. 2.

Fig. 4 is a section on line 4—4 of Fig. 2.

Fig. 5 is a section similar to Fig. 2 illustrating the manner of operation.

Fig. 6 is a view similar to Fig. 2 with the nut removed from the bolt.

Fig. 7 is a view similar to Fig. 1 showing a modified form of the invention.

Referring to the drawings in which like reference characters indicate like parts, 1 designates a nut shown applied to the threaded stem of a bolt 2. In the body of the nut is formed an elongated opening 3 which extends inwardly from the outer face 4 of the nut 1 a suitable distance into the body of the nut but which does not go clear through the body of the nut as will be seen in Fig. 3. The opening 3 is formed adjacent to and communicates at one end 7 thereof with the internally threaded tap hole 6 in the body of the nut while the other end 8 of the opening 3 is disposed away from the tap hole 6 as will be understood from Figs. 1, 2, 5, 6 and 7. In the opening 3 are positioned the spring 9 and the pin 10 so that the spring 9 occupies the end 8 and the pin 10 occupies the end 7 of said opening 3. The spring 9 tends to urge the pin 10 towards the end 7 of the opening 3 or into a position of contact with the thread 11 of the bolt 2 as will be clearly seen from Fig. 3. In this position of the parts it is possible to turn the bolt 2 in the direction of the arrow in Fig. 2 because when the bolt is thus turning in a counter-clockwise direction the thread 11 of the bolt bears upon the pin 10 and pushes it back against the tension of the spring 9. On the other hand if it is attempted to turn the bolt 2 in a clockwise direction, in the direction of the arrow in Fig. 5, the thread 11 on the bolt 2 will push the pin into a jammed position against the body of the nut at the end 7 of the opening 3 and it will be impossible to turn the bolt 2, unless the thread 11 on the bolt 2 taps a thread on the pin 10 which can not happen as the pin 10 is made of hard steel.

When it is desired to release the nut so that it may be unthreaded, a thin tool 12 such as a thin nail or wire is inserted in the front end 7 of the opening 3 to push the pin back towards and against the spring 9 thus removing the pin 10 from engagement with the thread 11 on the bolt 2 as shown in Fig. 5.

In Fig. 7 there is shown a modified form of the invention wherein an opening 3, a spring 9 and a pin 10 are provided at diametrically opposed points so as to lock the nut against turning in either direction. In this construction, if it is desired to thread or unthread the nut 1 on or off the bolt 2, a thin wire or tool 12 is inserted in the ends 7 of each of the openings 3 to push the pins 10 out of engagement with the thread 11 of the bolt 2. The nut is then free to turn in either direction. When the nut has reached its desired position, the wires or other instruments used to push the pins 10 out of their operative positions are withdrawn and the nut is locked against turning in either direction. It is, of course, understood that if desired either of the pins 10 (in Fig. 7) may be rendered inoperative with a corresponding effect upon the turning of the nut.

Having thus described our invention what we claim as new and desire to secure by Letters Patent, is:—

In a nut lock, a nut having a threaded bore and formed with a pocket extending at a tangent to the bore and opening through the outer face of the nut for its entire length, the inner end of said pocket having a side opening for its full depth communicating with the bore of the nut, a pin in said pocket circular in cross section and movable in the pocket towards and away from the inner end of said pocket whereby a side portion of the pin may extend through the side opening of the pocket into the bore for gripping engagement with threads of a bolt, and a spring in the outer end portion of said pocket engaging said pin to urge the pin towards the inner end thereof, edges of the pocket at the outer face of the nut being upset to retain the pin and spring in the pocket.

KARL GOTTLOB YOUNG.
HERMANN VEIT.